(12) United States Patent
Kawamura et al.

(10) Patent No.: US 7,562,103 B2
(45) Date of Patent: Jul. 14, 2009

(54) DISASTER RECOVERY PROCESSING METHOD AND APPARATUS AND STORAGE UNIT FOR THE SAME

(75) Inventors: Nobuo Kawamura, Atsugi (JP); Kota Yamaguchi, Yamato (JP); Takashi Oeda, Sagamihara (JP)

(73) Assignees: Hitachi, Ltd., Tokyo (JP); Hitachi Software Engineering Co., Ltd., Yokohama (JP)

( * ) Notice: Subject to any disclaimer, the term of this patent is extended or adjusted under 35 U.S.C. 154(b) by 339 days.

(21) Appl. No.: 11/227,180

(22) Filed: Sep. 16, 2005

(65) Prior Publication Data
US 2006/0010180 A1 Jan. 12, 2006

Related U.S. Application Data

(63) Continuation of application No. 10/650,842, filed on Aug. 29, 2003.

(30) Foreign Application Priority Data
Mar. 31, 2003 (JP) ............... 2003-096725

(51) Int. Cl.
G06F 17/30 (2006.01)
G06F 11/00 (2006.01)
(52) U.S. Cl. ........................ 707/202; 714/16
(58) Field of Classification Search ............... 707/1–10; 714/16
See application file for complete search history.

(56) References Cited

U.S. PATENT DOCUMENTS

| 4,751,702 A | 6/1988 | Beier et al. |
|---|---|---|
| 4,821,172 A | 4/1989 | Kaneko et al. |
| 5,170,480 A | 12/1992 | Mohan et al. |
| 5,280,611 A | 1/1994 | Mohan et al. |
| 5,530,855 A | 6/1996 | Satoh et al. |

(Continued)

FOREIGN PATENT DOCUMENTS

JP 2001-318801 11/2002

(Continued)

OTHER PUBLICATIONS

A. Reuter, Digital Equipment Corporation, Transaction Processing: Concepts and Technique Morgan Kaufmann Publishers, San Mateo, CA, pp. 554-557 and 604-609.

(Continued)

Primary Examiner—Mohammad Ali
Assistant Examiner—Navneet K Ahluwalia
(74) Attorney, Agent, or Firm—Mattingly & Malur, PC

(57) ABSTRACT

A technique capable of constructing a disaster recovery system reduced in performance degradation of a primary system is provided. The technique includes a step of conducting synchronous writing of log information into a secondary storage subsystem in a secondary system when a write request received from a host computer is a write request of log information, a step of temporarily storing a write request and conducting asynchronous writing into the secondary storage subsystem when the received write request is a write request of database data or status information, a step of modifying log information, data in a database area, and status information in the secondary storage subsystem according to contents of a write request received from a primary storage subsystem, and a step of recovering the database area according to contents of log information in a location indicated by the status information.

2 Claims, 11 Drawing Sheets

U.S. PATENT DOCUMENTS

| | | | |
|---|---|---|---|
| 5,594,900 | A | 1/1997 | Cohn et al. |
| 5,640,561 | A | 6/1997 | Satoh et al. |
| 5,745,674 | A | 4/1998 | Lupton et al. |
| 5,758,355 | A | 5/1998 | Buchanan |
| 5,781,912 | A | 7/1998 | Demers et al. |
| 6,065,018 | A | 5/2000 | Beier et al. |
| 6,163,856 | A | 12/2000 | Dion et al. |
| 6,173,292 | B1 | 1/2001 | Barber et al. |
| 6,173,377 | B1 | 1/2001 | Yanai |
| 6,178,427 | B1 | 1/2001 | Parker |
| 6,226,651 | B1 | 5/2001 | Masuda et al. |
| 6,289,357 | B1 | 9/2001 | Parker |
| 6,408,370 | B2 | 6/2002 | Yamamoto |
| 6,446,176 | B1 | 9/2002 | West et al. |
| 6,466,951 | B1 | 10/2002 | Birkler et al. |
| 6,467,034 | B1 | 10/2002 | Yanaka |
| 6,502,205 | B1 | 12/2002 | Yanai et al. |
| 6,567,928 | B1 | 5/2003 | Lyle et al. |
| 6,604,118 | B2 | 8/2003 | Kleiman |
| 6,606,694 | B2 | 8/2003 | Carteau |
| 6,615,223 | B1 | 9/2003 | Shih |
| 6,643,795 | B1 | 11/2003 | Sicola et al. |
| 6,658,590 | B1 | 12/2003 | Sicola |
| 6,671,705 | B1 | 12/2003 | Duprey |
| 6,723,123 | B1 | 4/2004 | Kazatchkov et al. |
| 6,732,124 | B1 | 5/2004 | Koseki et al. |
| 6,748,502 | B2 | 6/2004 | Watanabe et al. |
| 6,850,958 | B2 | 2/2005 | Wakabayashi |
| 6,889,231 | B1 | 5/2005 | Souder |
| 6,983,362 | B1 | 1/2006 | Kidder et al. |
| 7,003,694 | B1 * | 2/2006 | Anderson et al. ............. 714/16 |
| 7,032,131 | B2 | 4/2006 | Lubbers |
| 2002/0007468 | A1 | 1/2002 | Kampe et al. |
| 2002/0049925 | A1 | 4/2002 | Gallpeau |
| 2002/0095547 | A1 | 7/2002 | Watanabe et al. |
| 2002/0103815 | A1 | 8/2002 | Duvillier et al. |
| 2002/0107878 | A1 | 8/2002 | Tsuchida et al. |
| 2002/0133507 | A1 | 9/2002 | Holenstein et al. |
| 2002/0188711 | A1 | 12/2002 | Meyer et al. |
| 2003/0005355 | A1 | 1/2003 | Yanai |
| 2003/0074600 | A1 | 4/2003 | Tamatsu |
| 2003/0126133 | A1 | 7/2003 | Dattatri |
| 2003/0126163 | A1 | 7/2003 | Kim et al. |
| 2004/0034670 | A1 | 2/2004 | Bhuyan |
| 2004/0044865 | A1 | 3/2004 | Sicola |
| 2004/0064639 | A1 | 4/2004 | Sicola |
| 2004/0073831 | A1 | 4/2004 | Yanai et al. |
| 2004/0098371 | A1 | 5/2004 | Bayliss et al. |
| 2004/0098425 | A1 | 5/2004 | Wiss et al. |
| 2004/0107381 | A1 | 6/2004 | Bomfim et al. |
| 2004/0133591 | A1 | 7/2004 | Holenstein et al. |
| 2004/0139124 | A1 | 7/2004 | Kawamura et al. |
| 2004/0158588 | A1 | 8/2004 | Pruet, III |
| 2004/0193625 | A1 | 9/2004 | Sutoh |
| 2005/0229021 | A1 | 10/2005 | Lubbers et al. |
| 2005/0262298 | A1 | 11/2005 | Lubbers et al. |
| 2005/0262312 | A1 | 11/2005 | Morishita et al. |

OTHER PUBLICATIONS

Rahm, Performance Evaluation of Extended Storage Architectures for Transaction Processi University of Kaiserslautern, Germany.

Veritas Volume Replicator, Enterprise-Class Disaster Recovery for Mission-Critical Environments, 1992.

Haigen, Wang, et al, "The Database Recovery Rategy in Oracle", Journal of Inner Mongolia Polytechnic University, vol. 22, No. 3, Aug. 28, 2003 pp. 223-227 (with English Translation).

Niklander, Tiina et al, "Using Logs to Increase Availability in Real-Time Databases", Workshop on Parallel and Distributed Real-Time Systems, 2002, 7 pages.

Matthews et al, "Improving the Performance of Log-Structred File Systems with Adaptive Methods", Proceedings of the 16$^{th}$ ACM Symposium on Operating Systems Principles, 1997, pp. 238-251.

Azagury et al, "Advanced Functions for Storage Subsystems: Supporting Continous Avaliability", IBM Systems Journal, vol. 42, No. 2, 2003, pp. 268-279.

"No Data Loss Standby Database: Benefits of Combining EMC Symmetrix Remote Data Facility (SRDF) with Oracle Standby Database", EMC Corporation, 1998, 18 pages.

Stacey, D., "Replication: DB2, Oracle, and Sybase?", SIGMOD Record, vol. 21, No. 4, Dec. 1995, pp. 95-101.

Massiglia, Paul, "Veritas volume replication technology, and how it enhances disaster tolerance in Oracle databases", Veritas Software Corporation, Ed. May 29, 2000, pp. 3, 5, 7-11, 13-27, 29-31.

Mohan, C. et al, "Algorithms for the Management of Remote Backup Data Bases for Disaster Recovery", IEEE, 1993, pp. 511-518.

Burkes, D.L. et al, "Design Approaches for Real-Time Transaction Processing Remote Site Recovery", IEEE, 1990, pp. 568-572.

* cited by examiner

FIG. 4

DB-DISK MAPPING TABLE

| DATABASE AREA ID | FILE ID | KIND | PRIMARY DISK CONTROL DEVICE ID | PRIMARY PHYSICAL DEVICE ID (LUN) | SECONDARY DISK CONTROL DEVICE ID | SECONDARY PHYSICAL DEVICE ID (LUN) |
|---|---|---|---|---|---|---|
| DBAREA1 | FILE11 | DB | CTL#A1 | VOL11-A | CTL#B1 | VOL11-B |
| DBAREA2 | FILE21 | DB | CTL#A1 | VOL11-A | CTL#B1 | VOL11-B |
| LOG1 | FILE31 | LOG | CTL#A1 | VOL12-A | CTL#B1 | VOL12-B |
| LOG2 | FILE32 | LOG | CTL#A2 | VOL22-A | CTL#B2 | VOL22-B |
| STATUS1 | FILE41 | STATUS | CTL#A2 | VOL21-A | CTL#B2 | VOL21-B |

FIG. 5

PRIMARY/SECONDARY REMOTE COPY MAPPING TABLE

| COPY MODE | PRIMARY DISK CONTROL DEVICE ID | PRIMARY PHYSICAL DEVICE ID (LUN) | SECONDARY DISK CONTROL DEVICE ID | SECONDARY PHYSICAL DEVICE ID (LUN) |
|---|---|---|---|---|
| ASYNCHRONOUS | CTL#A1 | VOL11-A | CTL#B1 | VOL11-B |
| SYNCHRONOUS | CTL#A1 | VOL12-A | CTL#B1 | VOL12-B |
| ASYNCHRONOUS | CTL#A2 | VOL21-A | CTL#B2 | VOL21-B |
| SYNCHRONOUS | CTL#A2 | VOL22-A | CTL#B2 | VOL22-B |

DISASTER RECOVERY PROCESSING METHOD AND APPARATUS AND STORAGE UNIT FOR THE SAME

The present application is a continuation of application Ser. No. 10/650,842, filed Aug. 29, 2003, the contents of which are incorporated herein by reference.

BACKGROUND OF THE INVENTION

The present invention relates to a technique for executing processing in another information processing apparatus, or a program or an object that conducts its processing, in response to occurrence of a failure or a predetermined condition, or a request.

For conventional database management systems (or computer systems or information processing systems), there is a technique of placing a plurality of replications in a plurality of geographically distributed sites (computers or information processing apparatuses) by way of precaution against failures, i.e., the so-called disaster recovery technique, data of a certain site are stored in other geographically separated sites as replications. In the case wherein a failure is caused by a disaster or the like in a certain site, business is recovered in another site.

For database management systems (or computer systems or information processing systems, wherein database management systems are taken as an example), there are several methods as a technique of having such replications. Basically, a request is sent to a system that becomes principal when seen from clients, i.e., a primary system, and an information record called log is generated in the primary system, and used to recover the processing and as backup. In other words, this log record is sent from the primary system to a system called secondary system, and a host computer of the secondary system conducts the same modification processing as the primary system by referring to the log record and thereby modifies the state of the secondary system. Such a technique of implementing the replication by sending a log record generated in the primary system to the secondary system is disclosed in U.S. Pat. No. 5,640,561.

In a remote copy function (see U.S. Pat. No. 5,640,561) in a storage apparatus used when sending a log record or database data generated in a primary system to a secondary system, conventional data transfer methods are mainly divided broadly into the following two kinds.

(1) Synchronous Method

Upon a data write request from a host computer in a certain site (herein referred to as main site), a storage apparatus in the main site transfers pertinent data to a storage apparatus in another site (herein referred to as remote site). After arrival of a receipt report of pertinent data from the storage apparatus in the remote site, the storage apparatus in the main site reports writing completion to a host computer in the main site.

There is a merit that it is assured that data have arrived at the remote site when writing has been completed in the main site. On the other hand, there is a drawback that an increase in distance between sites or line delay increases the write response time in the main site and causes performance degradation.

(2) Asynchronous Method

When a data write request from a host computer in a main site has arrived, a storage apparatus in the main site reports writing completion to the host computer in the main site without waiting for completion of pertinent data transfer to a remote site.

As compared with the synchronous method, the possibility of performance degradation in the main site is reduced. In the case where a failure has occurred in the main site, there is a possibility that recent data are lost in the remote site and transactions are lost.

There are methods in which it is assured that the sequentiality of data writing in the main site coincides with that in the remote site as disclosed in U.S. Pat. No. 5,640,561, and methods in which it is not assured. For avoiding that the state in the middle of a transaction remains and consistency of a database cannot be assured, it is necessary to assure the sequentiality of data writing. The sequentiality assurance can be configured so as to be effective for a set of a plurality of disks. A technique for assuring the sequentiality for a set of a disk for log (journal) and a disk for DB is disclosed in U.S. Pat. No. 5,640,561.

In general, a database management system (DBMS) has a DB disk for storing data itself and a log disk for storing DB modification history information in a time series form. If a server in the main site (which is a computer or an information processing apparatus in the main site) is shut down, data on the DB disk assumes an incomplete modification state in some cases. At the time of restart of the DBMS, however, a consistent state is recovered on the basis of the DB modification history information on the log disk. (Such a technique is disclosed in Jim Gray and Andreas Reuter, "TRANSACTION PROCESSING: Concepts and Techniques," published by Morgan Kaufmann Publishers, which is hereafter referred to as reference paper 1) In other words, at the time of server shut down, modification data of completed transactions are forced to the DB disk (rollforward), and modification data of transactions that have been incomplete at the time of server down are invalidated (rollback).

As a transfer method in the disaster recovery system, the following methods are known.

(a) Log Synchronous and DB Synchronous Method

The log and DB are transferred synchronously to the remote site. The same states of the log and DB as those in the main site are always present in the remote site. When a failure has occurred, recovery processing in the same situation as the restart in the main site can be implemented. In other words, modification contents of transactions that have been completed in the main site are not lost in the remote site. Since the log and DB are transferred synchronously, however, the performance in the main site is degraded as compared with the case where such a configuration is not adopted.

(b) Log Asynchronous and DB Asynchronous Method

The log and DB are transferred asynchronously to the remote site. In addition, the modification sequentiality in the remote site is guaranteed. Since the modification in the remote side is delayed, states of the log and DB assumed in the main site the delay time before are present in the remote site. By making the modification sequentiality of the log and DB assured, the consistent DB state assumed in the main site the delay time before can be recovered. Although the performance degradation in the main site is slight, modification contents of transactions that have been completed in the main site are sometimes lost in the remote site.

SUMMARY OF THE INVENTION

If in the conventional database management system (or computer system or information processing system, where a database management system is taken as an example) the log and DB (where a database is taken as an example, but data stored to be used for processing may also be used) are transferred to the remote site in synchronism with the main site, the possibility that modification contents of transactions that have been completed in the main site are lost in the remote site is low. Since the log and DB are transferred synchronously, there is a problem that the performance in the main site is degraded as compared with the case where such a configuration is not adopted.

If in the conventional database management system the log and DB are transferred to the remote site asynchronously, then the performance degradation in the main site is slight, but there is a problem that modification contents of transactions that have been completed in the main site are sometimes lost in the remote site.

A first object of the present invention is to provide a technique in which the possibility that modification contents of transactions that have been completed in a main site are lost in a remote site is low, when executing processing in another information processing apparatus, or a program or an object that conducts its processing, in response to occurrence of a failure or a predetermined condition, or a request.

A second object of the present invention is to provide a technique in which the possibility that modification contents of transactions that have been completed in a primary system are lost in a secondary system is low.

A third object of the present invention is to provide a technique in which the performance degradation in the primary system can be reduced.

In a first program for storing processing data to be subject to processing using the first program and log information for recovering the processing in first storage means, and a second program for storing processing data to be subject to processing and log information for recovering the processing in second storage means, an information processing recovery method for recovering the processing using the first program, by executing the processing using the second program when a failure has occurred in the processing using the first program is first means. In the information processing recovery method, the following processing is executed.

In response to an input write request of the log information, the processing data, and status information indicating a storage location of the log information, the log information, the processing data, and the status information are stored in the first storage means. When the log information has been stored in the second storage means, a response to the write request is sent to the second storage means. When a predetermined condition is satisfied, the processing data and the status information are stored in the second storage means.

In a system in which switching to a second database processing system is conducted when a failure has occurred in a first database processing system and database processing is continued, second means executes the following processing. In response to a write request to the second database processing system, log information is modified by synchronous writing, and database data and status information are modified by asynchronous writing.

In a disaster recovery system in which switching to a secondary database processing system is conducted when a failure has occurred in a primary database processing system and database processing is continued, third means modifies log information by synchronous writing and modifies database data and status information by asynchronous writing, at the time of write request to the secondary system.

In a disaster recovery system according to the present invention, a host computer includes a database buffer for temporarily holding contents of a database area in a storage subsystem, and a log buffer for temporarily holding contents of modification processing for the database buffer. Contents of the database buffer are modified with the advance of execution of database processing in the host computer. When it has become necessary to force the modification contents to the database area in the storage subsystem, a write request of log information indicating contents of modification processing conducted on the database buffer, database data modified in the database buffer, or status information indicating a location of log information at the time of checkpoint is transmitted from the primary host computer in the primary system to the primary storage subsystem in the primary system.

The primary storage subsystem receives the write request from the host computer. According to contents of the received write request, modification of log information, data in the database area, and status information in the primary storage subsystem is conducted. The primary storage subsystem is previously configured so that a log information disk may be subject to synchronous remote copy and a database data disk and a status information disk may be subject to asynchronous remote copy that guarantees a modification sequentiality over both disks.

According to this configuration, the primary storage subsystem writes a write request for a log information disk into a secondary storage device in the secondary system by using a synchronous method, and writes a write request for a database area data disk and status information disk into the secondary storage device in the secondary system by using an asynchronous method.

The secondary storage subsystem receives a write request of the log information, database data, or status information from the primary storage subsystem. According to contents of the received write request, log information, database area data and status information in the secondary storage subsystem are modified (see U.S. Pat. No. 5,640,561).

If thereafter a failure occurs in the primary database processing system and database processing is started in the secondary database processing system, then log information is read out from a location indicated by the status information, and data in the database area in the secondary storage subsystem is modified according to contents of the log information thus read out. As a result, the database area in the secondary storage subsystem is restored to the consistent state of the database area immediately before the failure occurrence.

In business processing having a high DB modification ratio, the I/O load on the DB disk becomes high as compared with the log disk. On the other hand, transactions to be recovered in the secondary system depend on the information on the log disk. Therefore, it becomes possible to prevent modification contents of transactions completed in the primary system from being lost by conducting synchronous copy on the information on the log disk, and it becomes possible to construct a disaster recovery system reduced in performance degradation in the primary system by conducting asynchronous copy on the information on the DB disk.

According to the disaster recovery system of the present embodiment, log information is modified by synchronous writing and database data and status information are modified by asynchronous writing, when writing to the secondary system is requested, as heretofore described. Therefore, the contents of modification in transactions completed in the primary system are prevented from being lost in the secondary system. It is possible to construct a disaster recovery system reduced in performance degradation in the primary system.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing configuration information of a DB-disk mapping table 15;

FIG. 5 is a diagram showing an example of a primary/secondary remote copy management table;

DESCRIPTION OF THE EMBODIMENTS

Hereafter, a system of an embodiment in which upon a write request to a secondary system log information is updated by synchronous writing and database data and status information are modified by asynchronous writing will be described.

Figure 1:
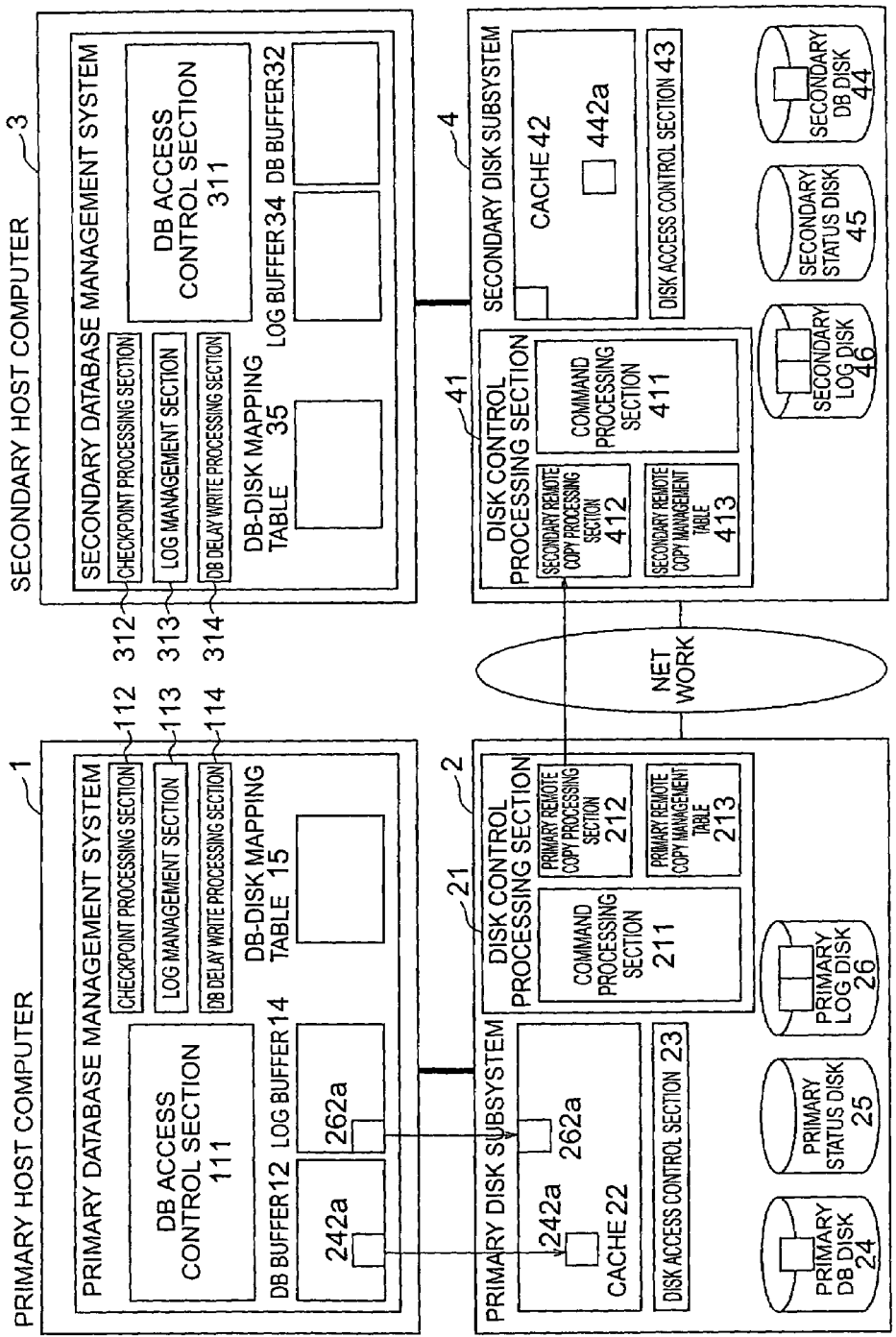
FIG. 1 is a diagram showing a system configuration of a disaster recovery system in the present embodiment.

FIG. 1 is a diagram showing a system configuration of the present embodiment. As shown in FIG. 1, a primary host computer 1 (which may be implemented by using a computer, an information processing apparatus, or a program or an object capable of conducting the processing) includes a DB access control section 111 (hardware, a program, or an object capable of conducting the processing), a checkpoint processing section 112 (hardware, a program, or an object capable of conducting the processing), a log management section 113 (hardware, a program, or an object capable of conducting the processing), and a DB delay write processing section 114 (hardware, a program, or an object capable of conducting the processing).

The DB access control section 111 is a processing section for controlling access to a primary DB disk 24 (storage means) and a primary log disk 26 (storage means) via a DB buffer 12 (storage means) and a log buffer 14 (storage means). The checkpoint processing section 112 is a processing section for transmitting a write request of all DB blocks modified in the DB buffer 12, and status information indicating a log disk of a latest log record at that time point and its location, from the primary host computer 1 to a primary disk subsystem 2, when it has become necessary to force contents in the DB buffer 12 in the primary host computer 1 to a storage device in the primary disk subsystem 2, which is a disk subsystem in a primary system.

As disclosed in the reference paper 1, some transactions are not complete at the time of a checkpoint. Besides the location of the latest log record, therefore, the status information indicates in some cases the locations of the oldest log records relating to the uncompleted transactions. Modification of the status information on a disk is delayed in some cases. In either case, the status information may be used as information indicating the location of the log where reference is to be started when the database management system restarts.

The log management section 113 is a processing section for transmitting a write request of a log block 262a, which is log information indicating contents of database processing that has been conducted on the DB buffer 12, from the primary host computer 1 to a primary disk subsystem 2. The DB delay write processing section 114 is a processing section for transmitting a write request of database data on the DB buffer 12 from the primary host computer 1 to the primary disk subsystem 2.

A program for making the primary host computer 1 function as the DB access control section 111, the checkpoint processing section 112, the log management section 113 and the DB delay write processing section 114 is recorded on a recording medium such as a CD-ROM, stored on a magnetic disk or the like, and thereafter loaded into a memory, and executed. The recording medium for recording the program thereon may also be another recording medium other than the CD-ROM. The program may be installed in the information processing apparatus from the recording medium and used, or the recording medium may be accessed through a network to use the program.

The primary disk subsystem 2 (which may be implemented by using a storage unit, a disk system, a computer, an information processing apparatus, or a program or an object capable of conducting the processing) includes a disk control processing section 21 (hardware, a program, or an object capable of conducting the processing), a command processing section 211 (hardware, a program, or an object capable of conducting the processing), a primary remote copy processing section 212 (hardware, a program, or an object capable of conducting the processing), and a disk access control section 23 (hardware, a program, or an object capable of conducting the processing).

The disk control processing section 21 is a control processing section for controlling operation of the whole primary disk subsystem apparatus. The command processing section 211 is a processing section for receiving a write request of a DB block 242a, the status information or a log block 262a from the primary host computer 1, and modifying contents of the primary DB disk 24, a primary status disk 25, the primary log disk 26, or a cache memory 22 (storage means) for storing their contents, included in the primary disk subsystem, according to contents of the received write request.

The primary remote copy processing section 212 is a processing section for referring to the primary remote copy management table and conducting synchronous or asynchronous remote copying according to configuration information in the primary remote copy management table. If in the case of the present embodiment the received write request is a write request of the log block 262a, then the primary remote copy processing section 212 conducts synchronous write processing of the log block 262 into a secondary disk subsystem 4, which is a disk subsystem of a secondary system (which may be implemented by using a computer, an information processing apparatus, or a program or an object capable of conducting the processing). If the received write request is a write request of the log block 242a or status information, then the primary remote copy processing section 212 temporarily stores the write request and conducts asynchronous write processing into the secondary disk subsystem 4. The disk access control section 23 is a processing section for controlling access to respective magnetic disk devices placed under the primary disk subsystem 2.

A program for making the primary disk subsystem 2 function as the disk control processing section 21, the command processing section 211, the primary remote copy processing section 212 and the disk access control section 23 is recorded on a recording medium such as a floppy disk, and executed. The recording medium for recording the program thereon may also be another recording medium other than the floppy disk. The program may be installed in the information processing apparatus from the recording medium and used, or the recording medium may be accessed through a network to use the program.

A secondary host computer 3 (which may be implemented by using a computer, an information processing apparatus, or a program or an object capable of conducting the processing) includes a DB access control section 311 (hardware, a program, or an object capable of conducting the processing), a checkpoint processing section 312 (hardware, a program, or an object capable of conducting the processing), a log management section 313 (hardware, a program, or an object capable of conducting the processing), and a DB delay write processing section 314 (hardware, a program, or an object capable of conducting the processing).

The DB access control section 311 is a processing section for conducting processing similar to that of the DB access control section 111 in the primary system, at the time of operation of the secondary system. The checkpoint processing section 312 is a processing section for conducting processing similar to that of the checkpoint processing section 112 in the primary system, at the time of operation of the secondary system.

The log management section 313 is a processing section for conducting processing similar to that of the log management section 113 in the primary system, at the time of operation of the secondary system. The DB delay write processing section 314 is a processing section for conducting processing similar to that of the DB delay write processing section 114 in the primary system, at the time of operation of the secondary system.

A program for making the secondary host computer 3 function as the DB access control section 311, the checkpoint processing section 312, the log management section 313 and the DB delay write processing section 314 is recorded on a recording medium such as a CD-ROM, stored on a magnetic disk or the like, and thereafter loaded into a memory, and executed. The recording medium for recording the program thereon may also be another recording medium other than the CD-ROM. The program may be installed in the information processing apparatus from the recording medium and used, or the recording medium may be accessed through a network to use the program.

A secondary disk subsystem 4 (which may be implemented by using a storage unit, a disk system, a computer, an information processing apparatus, or a program or an object capable of conducting the processing) includes a disk control processing section 41 (hardware, a program, or an object capable of conducting the processing), a command processing section 411 (hardware, a program, or an object capable of conducting the processing), a secondary remote copy processing section 412 (hardware, a program, or an object capable of conducting the processing), and a disk access control section 43 (hardware, a program, or an object capable of conducting the processing).

The disk control processing section 41 is a control processing section for controlling operation of the whole secondary disk subsystem apparatus. When switching from the primary system to the secondary system is conducted and database processing in the database processing system in the secondary system is started, the command processing section 411 reads out a log record from a location of a log block 462a indicated by status information in a secondary status disk 45 and sends out the log record to the secondary host computer 3, in accordance with an order issued by the secondary host computer 3. By modifying data on a secondary DB disk 44 in the secondary disk subsystem 4 according to contents of the pertinent log record analyzed by the secondary host computer in accordance with an order issued by the secondary host computer 3, the disk control processing section 41 conducts processing of restoring the state of the secondary DB disk 44 in the secondary disk subsystem 4 to the state of the primary DB disk 24 immediately before the switching to the secondary system. The disk control processing section 41 conducts modification on the secondary DB disk 44, the secondary status disk 45 and a secondary log disk 46 in keeping with database processing after the switching.

The secondary remote copy processing section 412 is a processing section for receiving a write request of the DB block 242a, the status information or the log block 262a from the primary disk subsystem 2, and conducting modification on the secondary DB disk 44, the secondary status disk 45 and the secondary log disk 46 in the secondary disk subsystem 4, or on a cache memory 42 storing their contents. The disk access control section 43 is a processing section for controlling access to respective magnetic devices placed under the secondary disk subsystem 2. In the case of the asynchronous remote copy, modification on the pertinent cache memory 42 or disk is conducted after confirmation of the sequentiality, as described in JP-A-11-85408 entitled "Storage control apparatus."

A program for making the secondary disk subsystem 4 function as the disk control processing section 41, the command processing section 411, the secondary remote copy processing section 412 and the disk access control section 43 is recorded on a recording medium such as a floppy disk, and executed. The recording medium for recording the program thereon may also be another recording medium other than the floppy disk. The program may be installed in the information processing apparatus from the recording medium and used, or the recording medium may be accessed through a network to use the program.

In the disaster recovery system of the present embodiment, the primary disk subsystem 2 for the primary host computer 1 serving as the primary system and the secondary disk subsystem 4 for the subsidiary host computer 3 serving as the secondary system may be connected to each other via a fiber channel, a network such as Ethernet, Gigabit Ethernet or SONET, or a link. The connection means may be a virtual network, or any data communication means using radio, broadcast communication or satellite communication.

In the primary host computer 1, the DB access control section 111 of the primary system operates. The primary host computer 1 includes the DB buffer 12 for temporarily holding contents of the primary DB disk 24 in the primary disk subsystem 2, and the log buffer 14 for temporarily holding contents of modification processing conducted on the DB buffer 12. Each of the DB buffer 12 and the log buffer 14 may also be a volatile memory, which typically loses data at the time of a power failure.

In the primary disk subsystem 2, the primary DB disk 24 on a magnetic disk device is accessed through the disk control processing section 21, the cache memory 22 and the disk access control section 23, which receive an instruction from the primary host computer and operate. Disk access is conducted always via the cache memory 22. The cache memory 22 may also be a volatile memory, which typically loses data at the time of a power failure. In this case, at the time when data is stored in the cache memory 22, the data is guaranteed.

If access to the primary DB disk 24 is requested by a transaction, then the DB access control section 111 in the primary host computer 1 of the present embodiment acquires the DB block 242a from the primary disk subsystem 2 by using a read command, stores the DB block 242a in the DB buffer 12, conducts database processing on the DB block 242a in the DB buffer 12, and then stores log information indicating contents of the processing in the log block 262a in the log buffer 14.

If it has become necessary to force the contents of the DB buffer 12 in the primary host computer 1 to a storage device in the primary disk subsystem 2 serving as a disk subsystem in the primary system, such as when log records indicating that records on the DB buffer 12 has been modified arrives at a predetermined number, then the checkpoint processing section 112 generates a write command for writing a DB block or status information, as a write request for all DB blocks modified in the DB buffer 12 and status information indicating a location of a log record that is the latest at that time point, and transmits the write command from the primary host computer 1 to the primary disk subsystem 2.

If at the time of transaction committing, a predetermined condition, such as elapse of a predetermined time since start of log information recording or disappearance of an empty place in the log buffer 14, is arrived at, then the log management section 113 generates a write command for writing the log block 262a, as a write request of the log block 262a stored in the log buffer 14 into the primary log disk 26, and transmits the write command from the primary host computer 1 to the primary disk subsystem 2.

If a predetermined condition, such as elapse of a predetermined time since start of database processing or disappearance of an empty place in the DB buffer 12, is arrived at, then the DB delay write processing section 114 generates a write command for writing the DB block 242a, as a write request of the DB block 242a stored in the DB buffer 12 into the primary DB disk 24, and transmits the write command from the primary host computer 1 to the primary disk subsystem 2.

With respect to a write request of the log block 262a included in write requests transmitted from the primary host computer 1 as described above, the primary disk subsystem 2 of the present embodiment conducts synchronous remote copy processing to the secondary disk subsystem 4 in synchronism with writing performed in the primary disk subsystem 2. With respect to writing of a DB block and status information, the primary disk subsystem 2 of the present embodiment conducts asynchronous remote copy processing, which is not synchronized to writing in the primary disk subsystem 2, to the secondary disk subsystem 4.

Figure 2:
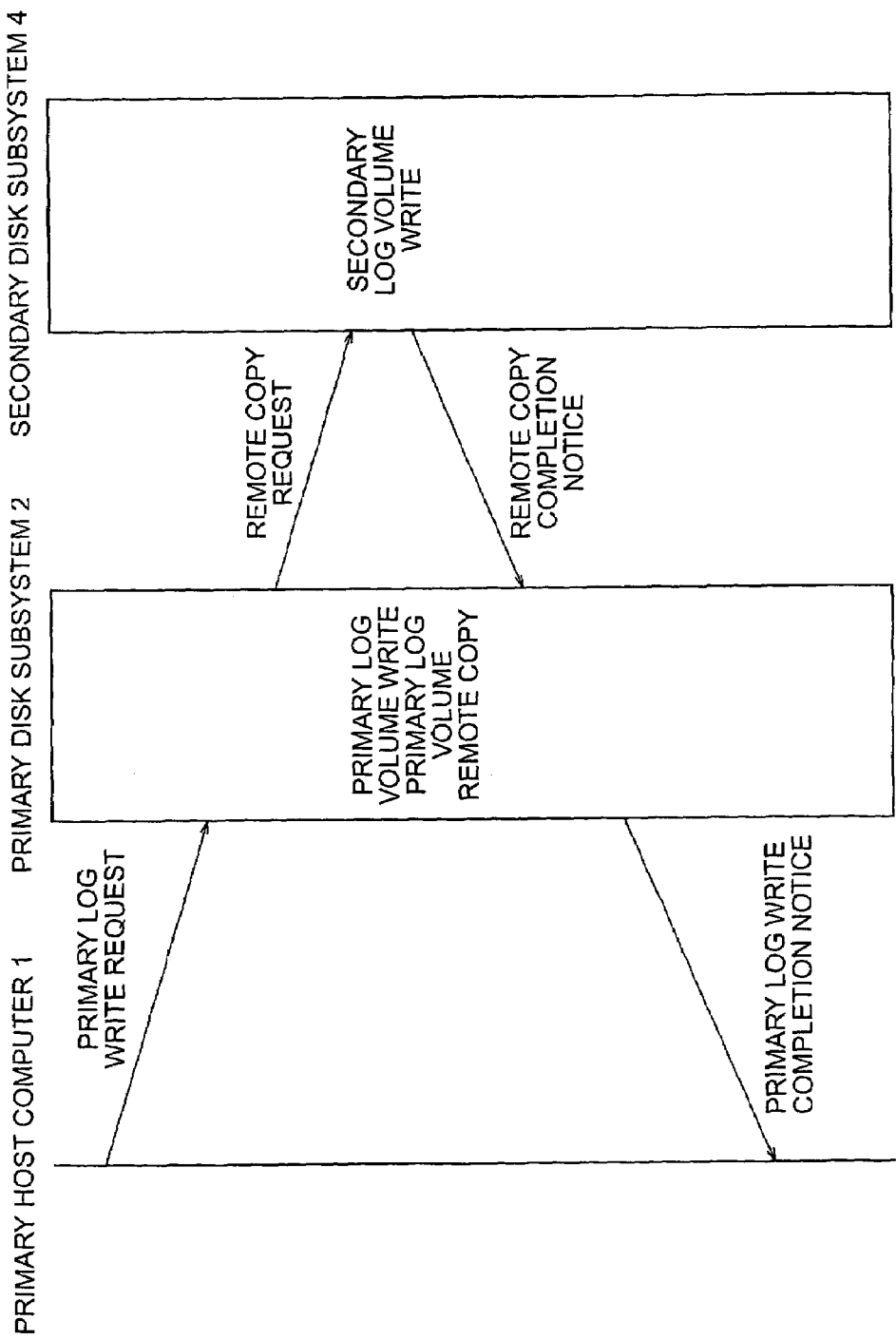
FIG. 2 is a diagram showing an outline of synchronous remote copy processing in a log block 262a in the present embodiment.

FIG. 2 is a diagram showing an outline of synchronous remote copy processing of the log block 262a in the present embodiment. If a primary log write request for requesting to write the log block 262a is transmitted from the primary host computer 1 as shown in FIG. 2, then the primary disk subsystem 2 writes the log block 262a transmitted together with the write request into the cache 22, transmits the log block 262a to the secondary disk subsystem 4, requests remote copy of the log block 262a in the secondary disk subsystem 4, and waits for completion of the remote copy.

If a command for requesting to write the log block 262a is transmitted from the primary disk subsystem 2, then the secondary disk subsystem 4 writes the log block 262a transmitted together with the write request into the cache 22, and thereafter generates a remote copy completion notice indicating that the writing has been completed, and transmits the remote copy completion notice to the primary disk subsystem 2.

Upon receiving the remote copy completion notice from the secondary disk subsystem 4, the primary disk subsystem 2 generates a primary log write completion notice indicating that the writing the log block 262a requested by the primary host computer 1 has been completed, and transmits the primary log write completion notice to the primary host computer 1.

Figure 3:
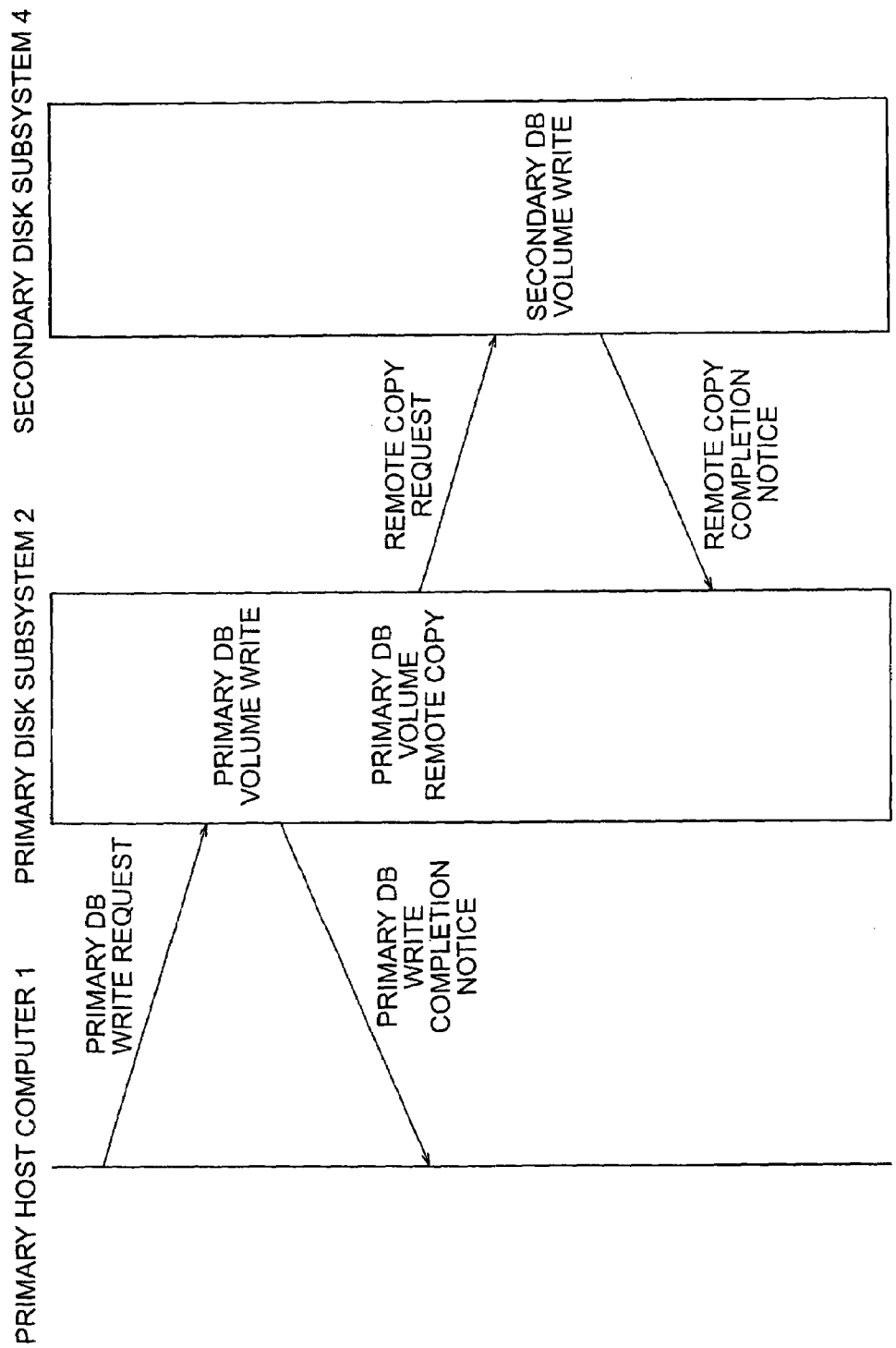
FIG. 3 is a diagram showing an outline of asynchronous remote copy processing of DB blocks and status information in the present embodiment.

FIG. 3 is a diagram showing an outline of asynchronous remote copy processing of a DB block and status information in the present embodiment. If a primary DB write request for requesting to write the DB block and the status information is transmitted from the primary host computer 1 as shown in FIG. 3, then the primary disk subsystem 2 writes the DB block and the status information transmitted together with the write request into the cache 22, thereafter temporarily stores the DB block and the status information in a queue in a memory or a magnetic disk in the primary disk subsystem 2, generates a primary DB write completion notice indicating that writing the DB block 242a requested by the primary host computer 1 has been completed, and transmits the primary DB write completion notice to the primary host computer 1.

Thereafter, the primary disk subsystem 2 transmits the stored DB block or status information to the secondary disk subsystem 4, requests remote copy of the DB block and status information in the secondary disk subsystem 4, and waits for completion of the remote copy.

If a remote copy request for requesting to write the DB block or status information is transmitted from the primary disk subsystem 2, then the secondary disk subsystem 4 receives the DB block or status information transmitted together with the remote copy request, thereafter generates a remote copy completion notice indicating that the request has been completed, and transmits the remote copy completion notice to the primary disk subsystem 2.

FIG. 4 is a diagram showing configuration information of a DB-disk mapping table 15 in the present embodiment. As shown in FIG. 4, the DB-disk mapping table 15 stores a database area ID, a file ID, and a kind. The database area ID is information for identifying a database area in the primary DB disk 24. The file ID indicates a sequential number of a file in the case where the database area identified by the database area ID includes a plurality of files. The kind indicates which of database data, log information and status information is data stored in the database area.

With respect to a disk control device number for identifying a disk control device to which the database area is mapped, and a physical device ID of a magnetic disk device included in magnetic disk devices controlled by a disk control device having the disk control device number to which the database area is mapped, IDs of the primary disk subsystem 2 and the secondary disk subsystem 4 are stored.

A DB-disk mapping table 35 in the secondary disk subsystem 4 also has a configuration similar to that of the DB-disk mapping table 15 in the primary disk subsystem 2.

FIG. 5 is a diagram showing an example of a primary/secondary remote copy management table in the present embodiment. As shown in FIG. 5, a copy mode indicating whether the write processing is conducted synchronously or asynchronously is stored in a primary remote copy management table 213 and a secondary remote copy management table 413. With respect to a disk control device number of a disk control device in which write processing is conducted with that copy mode, and a physical device ID of a magnetic disk device, IDs in the primary disk subsystem 2 and the secondary disk subsystem 4 are stored.

On the basis of information in the DB-disk mapping table 15 shown in FIG. 4 and information in the primary remote copy management table 213 shown in FIG. 5, it can be determined whether each of the log block, DB block and status information is written into the secondary disk subsystem synchronously or asynchronously. For example, on the basis of FIG. 4, a log block in a database area ID "LOG1" is written into a magnetic disk device having a primary disk control device ID "CTL#A1" and a primary physical device ID "VOL12-A." With reference to FIG. 5, the copy mode for the magnetic disk device having the primary disk control device ID "CTL#A1" and the primary physical device ID "VOL12-A" is "synchronous." Therefore, the log block in the database area ID "LOG1" is written into the secondary disk subsystem 4 by the synchronous remote copy processing.

On the other hand, the system serving as the secondary system also has a similar configuration. The primary disk subsystem 2 and the secondary disk subsystem 4 are connected to each other via the network. In the standby state, the secondary host computer 3 is not in operation. The secondary disk subsystem 4 receives the log block, DB block and status information from the primary disk subsystem 2 via the network, and modifies disks respectively corresponding to them.

When acquiring a checkpoint, the checkpoint processing section 112 in the primary host computer 1 of the present embodiment stores all DB blocks modified on the DB buffer 12 in the primary DB disk 24, and stores status information indicating the location of the log record at that time in the primary status disk 25. Hereafter, this checkpoint acquisition processing will be described.

Figure 6:
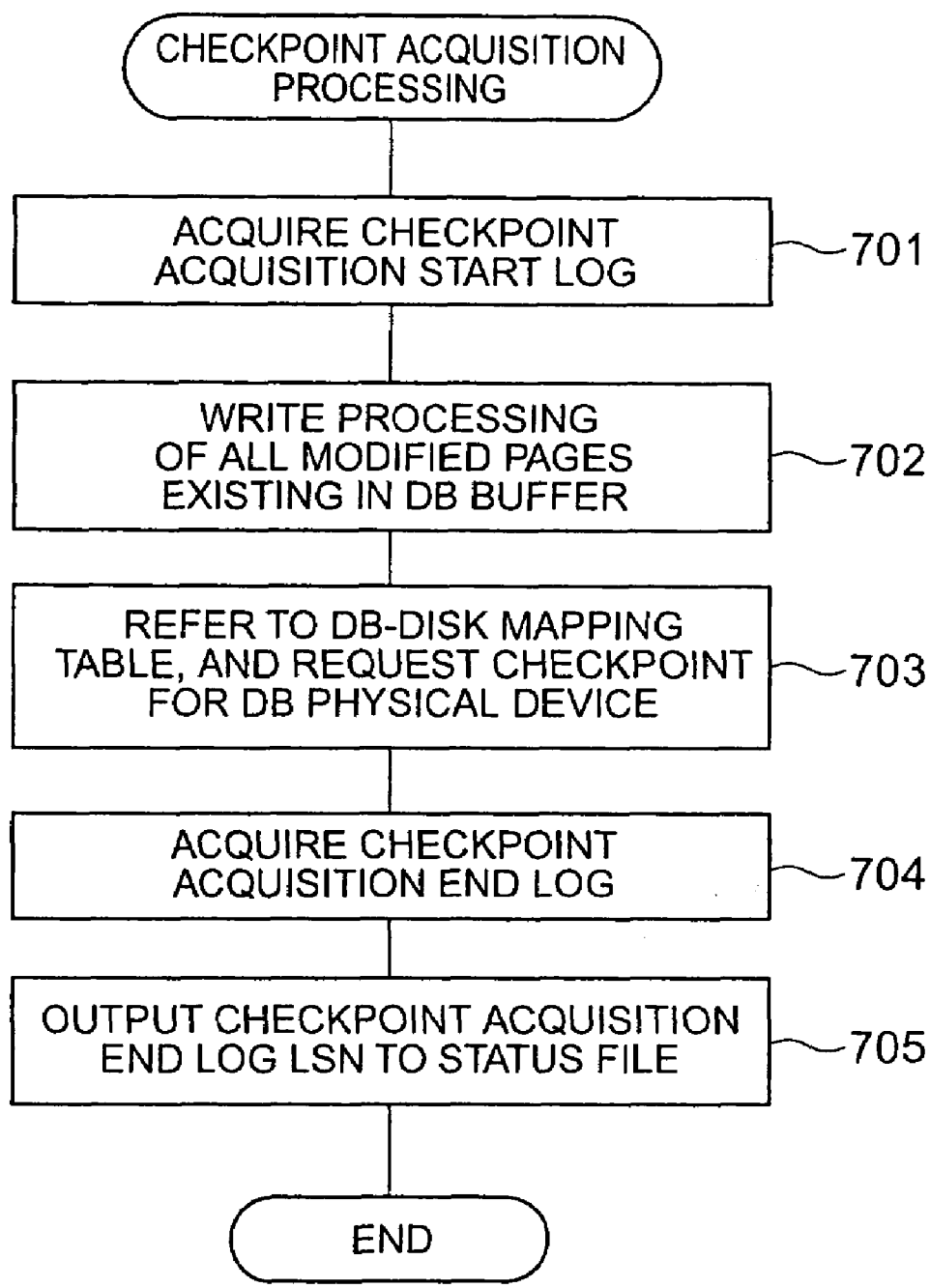
FIG. 6 is a flow chart showing a processing procedure of checkpoint acquisition processing in the present embodiment.

FIG. 6 is a flow chart showing a processing procedure of the checkpoint acquisition processing in the present embodiment. When it has become necessary to force the contents of the DB buffer 12 in the primary host computer 1 to a storage device in the primary disk subsystem 2 serving as a disk subsystem in the primary system, the checkpoint processing section 112 in the primary host computer 1 conducts processing of transmitting a write request for all DB blocks modified in the DB buffer 12 and the status information indicating the location of the log record that is the latest at that time point, from the primary host computer 1 to the primary disk subsystem 2 as shown in FIG. 6.

At step 701, the checkpoint processing section 112 generates a checkpoint acquisition start log, which indicates that the checkpoint acquisition has been started, and stores the checkpoint acquisition start log in the log block 262a.

At step 702, the checkpoint processing section 112 generates a write command for writing all DB blocks modified on the DB buffer 12 into the primary disk subsystem 2, transmits the write command to the primary disk subsystem 2 to request the primary disk subsystem 2 to write the DB blocks. The primary disk subsystem 2 receives the write command, writes the DB blocks into the cache memory 22, and forces contents of modification conducted in the DB buffer 12 to the cache memory 22.

Step 703 will be described at the end of the description of the present embodiment.

At step 704, a checkpoint acquisition end log, which indicates that the checkpoint acquisition has been finished, is generated and stored in the log block 262a.

At step 705, a write command for writing an LSN (Log Sequence Number) of the checkpoint acquisition end log into the primary disk subsystem 2 as status information is generated, and the write command is transmitted to the primary disk subsystem 2 to request the primary disk subsystem 2 to write the status information. Upon receiving the write command in the primary disk subsystem 2, the status information is written into the primary status disk 25.

In the case where database processing in the primary database processing system is terminated abnormally because of a failure or the like and thereafter the processing in the primary database processing system is resumed, the state of the database that has been completed until immediately before the termination can be recovered by reading out a log record from a location indicated by status information in the primary status disk 25 and modifying data in the primary DB disk 24 according to contents of the log record.

Supposing that in the disaster recovery system of the present embodiment the primary host computer 1 has requested the primary disk subsystem 2 to write the log block, DB block or status information, processing conducted in the primary disk subsystem 2 will now be described.

Figure 7:
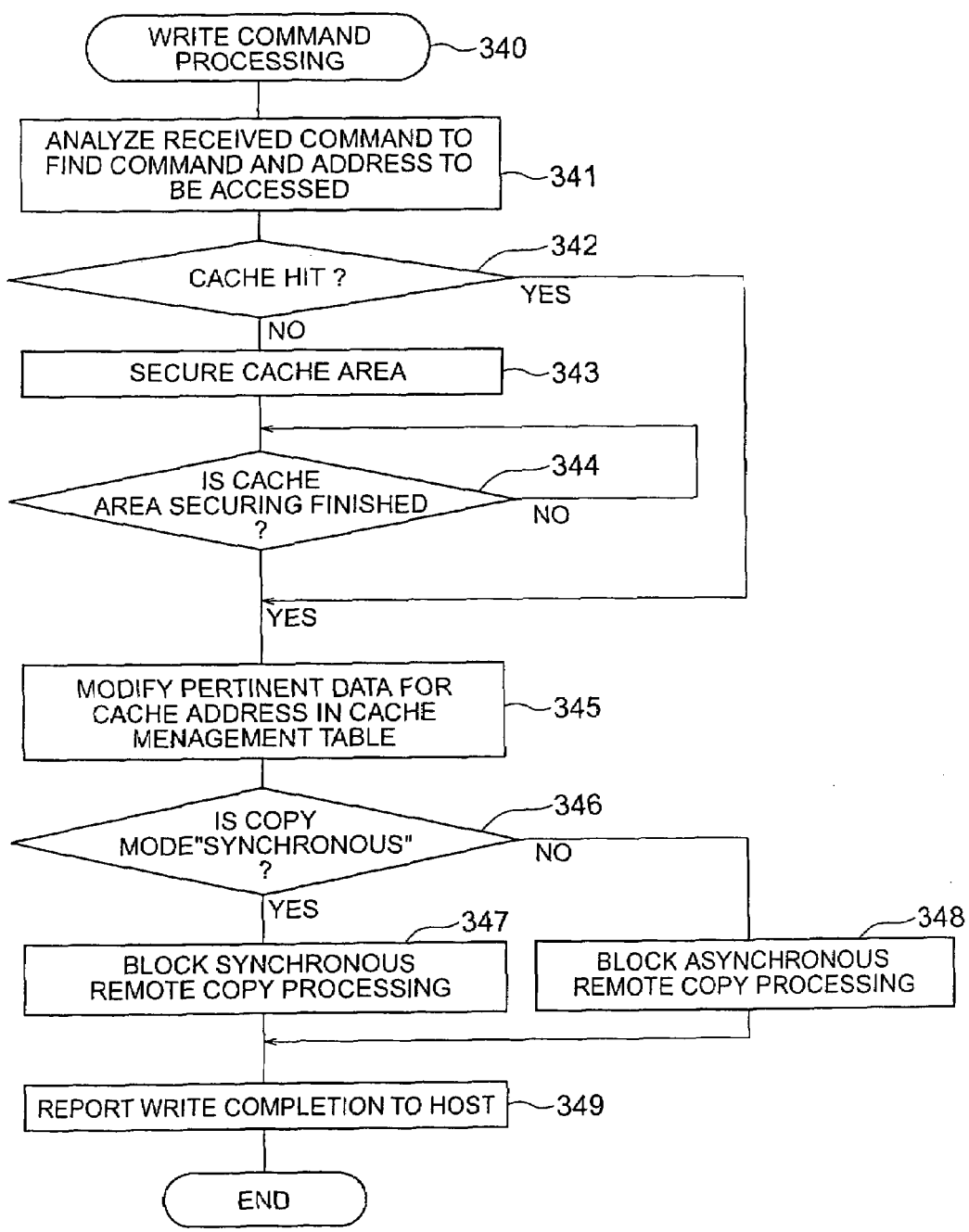
FIG. 7 is a flow chart showing a processing procedure conducted upon receiving a write command in the present embodiment.

FIG. 7 is a flow chart showing a processing procedure taken in the present embodiment when a write command has been received. Upon receiving a command from the primary host computer 1 as shown in FIG. 7, the command processing section 211 in the primary disk subsystem analyzes the received command to find a command kind and an address to be accessed, and recognizes that the command is a write command (step 341). It is now supposed that a device ID requested to be accessed can be acquired from the address to be accessed by comparing the address to be accessed with information in a device configuration management table, which indicates addresses assigned to a plurality of disk subsystems and their magnetic disk devices.

Subsequently, it is determined whether data of the address to be accessed found at the step 341 is held in the cache memory 22 in the primary disk subsystem 2, and a cache hit miss decision is conducted (step 342).

In the case of a cache miss in which the data to be accessed is not held in the cache memory 22, a transfer destination cache area is secured. The cache address of the transfer destination is managed and acquired by using a typical method such as a cache vacancy list.

If a cache hit is judged at the step 342 to hold true, or insurance of a cache area is finished at step 344, then modification of the data is conducted on the cache memory 22 in the primary disk subsystem 2 (step 345). In other words, contents of the DB block 242a, the status information, or the log block 262a received from the primary host computer 1 are written into the cache memory 22.

At step 346, the primary remote copy management table 213 is referred to, and a copy mode corresponding to the primary disk control device ID and the primary physical device ID indicated by the address to be accessed is read out to make a decision whether the copy mode is "synchronous."

If the copy mode is "synchronous" as a result of the decision, i.e., the received write request is a write request for the log block 262a, then the processing proceeds to step 347. At the step 347, completion of the synchronous remote copy is waited for, and thereby synchronous remote copy processing of the log block 262a is conducted.

If the copy mode is "asynchronous," i.e., the received write request is a write request of the DB block 242a or the status information, then the processing proceeds to step 348. At the step 348, the received data is temporarily stored in a queue in a memory or a magnetic disk in the primary disk subsystem 2 in order to prepare for asynchronous remote copy processing to be conducted thereafter on the secondary disk subsystem 4.

At step 349, completion of the write command processing is reported to the primary host computer 1.

The primary disk subsystem 2 transmits the stored data to the secondary disk subsystem 4, and executes asynchronous remote copy processing of the DB block or status information to the secondary disk subsystem 4.

Figure 8:
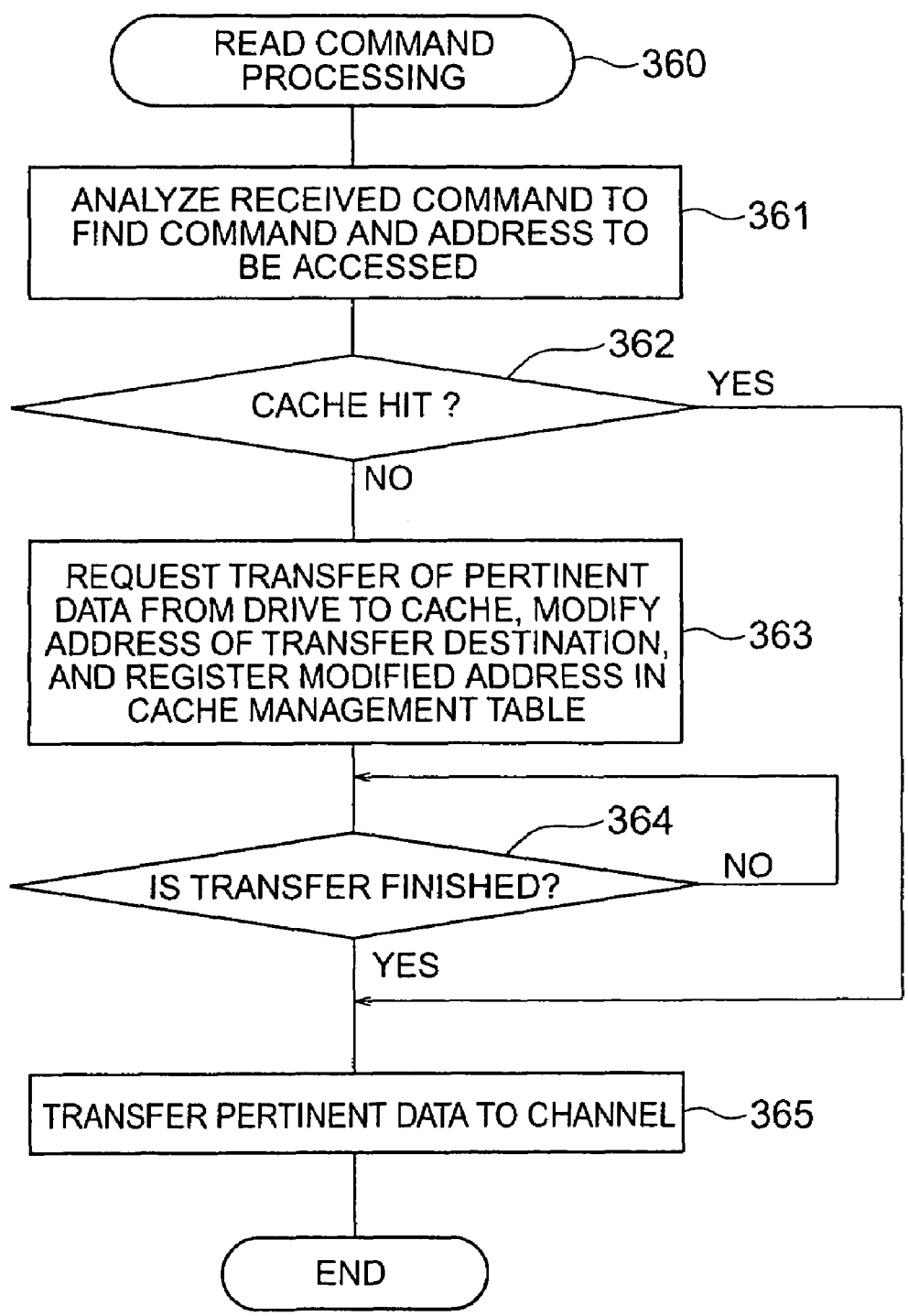
FIG. 8 is a flow chart showing a processing procedure conducted upon receiving a read command in the present embodiment.

FIG. 8 is a flow chart showing a processing procedure taken in the present embodiment when a read command has been received. Upon receiving a command from the primary host computer 1 as shown in FIG. 8, the command processing section 211 analyzes the received command to find a command kind and an address to be accessed, and recognizes that the command is a read access request (step 361). It is now supposed that a device ID requested to be accessed can be acquired from the address to be accessed.

Subsequently, it is determined whether data of the address to be accessed found at the step 361 is held in the cache memory 22 in the primary disk subsystem 2, and a cache hit miss decision is conducted (step 362).

In the case of a cache miss in which the data to be accessed is not held in the cache memory 22, a device ID requested to be accessed is discriminated as described above, and the disk access control section 23 in the primary disk subsystem 2 is requested to transfer from a magnetic disk device corresponding to the device ID to the cache memory 22 (step 363). In this case, the read processing is interrupted until the end of transfer (step 364), and the read processing is continued again after the end of the transfer processing. The cache address of the transfer destination may be managed and acquired by using a typical method such as a cache vacancy list. As for the address of the transfer destination, however, it is necessary to modify a cache management table and thereby conduct registration.

If a cache hit is judged at the step 362 to hold true, or the transfer processing is finished at step 364, then data in the cache memory in the disk subsystem is transferred to a channel (step 365).

Supposing that in the disaster recovery system of the present embodiment the primary disk subsystem 2 has requested the secondary disk subsystem 4 to write the log block synchronously or write the DB block or status information asynchronously, processing conducted in the secondary disk subsystem 4 will now be described.

Figure 9:
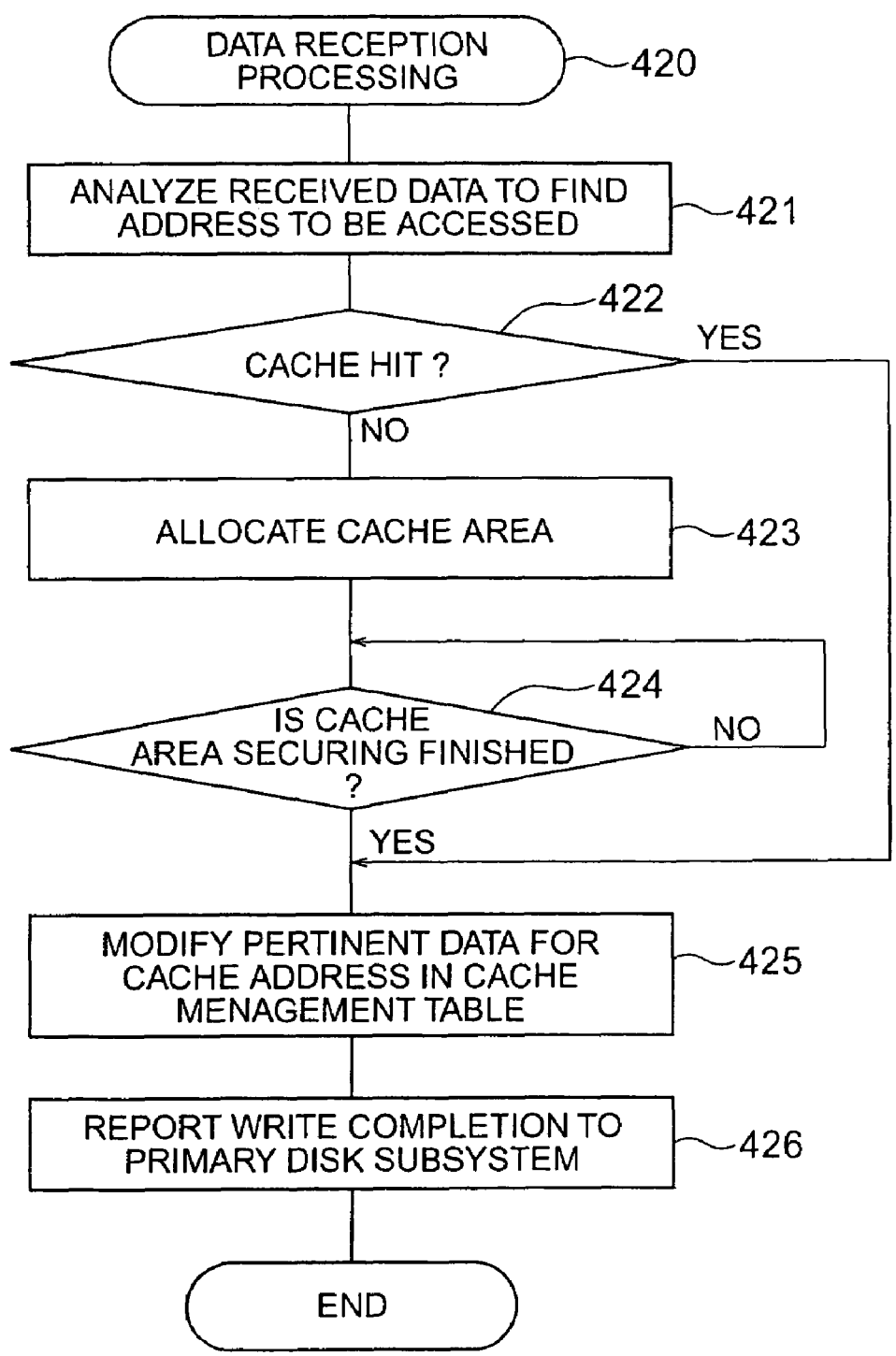
FIG. 9 is a flow chart showing a processing procedure of data reception processing in a secondary disk subsystem 4 in the present embodiment.

FIG. 9 is a flow chart showing a processing procedure of data reception processing conducted by the secondary disk subsystem 4 in the present embodiment. Upon receiving a command from the primary host computer 1 as shown in FIG. 9, the secondary remote copy processing section 412 in the secondary disk subsystem 4 analyzes the received command to find a command kind and an address to be accessed, and recognizes that the command is a remote copy command (step 421). It is now supposed that a device ID requested to be accessed can be discriminated from the address to be accessed.

Subsequently, it is determined whether data of the address to be accessed found at the step 421 is held in the cache memory 42 in the secondary disk subsystem 4, and a cache hit miss decision is conducted (step 422).

In the case of a cache miss in which the data to be accessed is not held in the cache memory 42, a transfer destination cache area is secured. The cache address of the transfer destination may be managed and acquired by using a typical method such as a cache vacancy list. As for the address of the transfer destination, however, it is necessary to modify a cache management table and thereby conduct registration.

If a cache hit is judged at the step 422 to hold true, or insurance of a cache area is finished at step 424, then modification of the data is conducted on the cache memory 42 in the secondary disk subsystem 4 (step 425). In other words, contents of the DB block 242a, the status information, or the log block 262a received from the primary disk subsystem 2 are written into the cache memory 42. The case of the synchronous remote copy has heretofore been described. In the case where asynchronous remote copy is used and the sequentiality as described in JP-A-11-85408 entitled "storage control apparatus" is guaranteed, it is necessary before modification on the cache to ascertain that all data that should arrive by then are ready.

At step 426, completion of the report copy command processing is reported to the primary disk subsystem 2.

As for the log block write request, synchronous remote copy processing in the secondary disk subsystem 4 synchronized with the writing in the primary disk subsystem 2 is conducted, in the disaster recovery system of the present embodiment as described above. Therefore, it is possible to prevent that contents of transaction modification that has been completed in the primary system are lost in the secondary system. As for the DB block and status information writing, asynchronous remote copy processing in the secondary disk subsystem 4, which is not synchronized with the writing in the primary disk subsystem 2, is conducted. Therefore, performance degradation in the primary system can be prevented as far as possible.

If writing in the secondary disk subsystem 4 is conducted as described above and thereafter a failure occurs in the primary database processing system and database processing is started in the secondary database processing system, then in DBMS start processing log information is read out from a location indicated by status information in the secondary status disk 45, and the state of the database area in the primary system immediately before the occurrence of the failure is recovered on the secondary DB disk 44 in the secondary disk subsystem 4.

Figure 10:
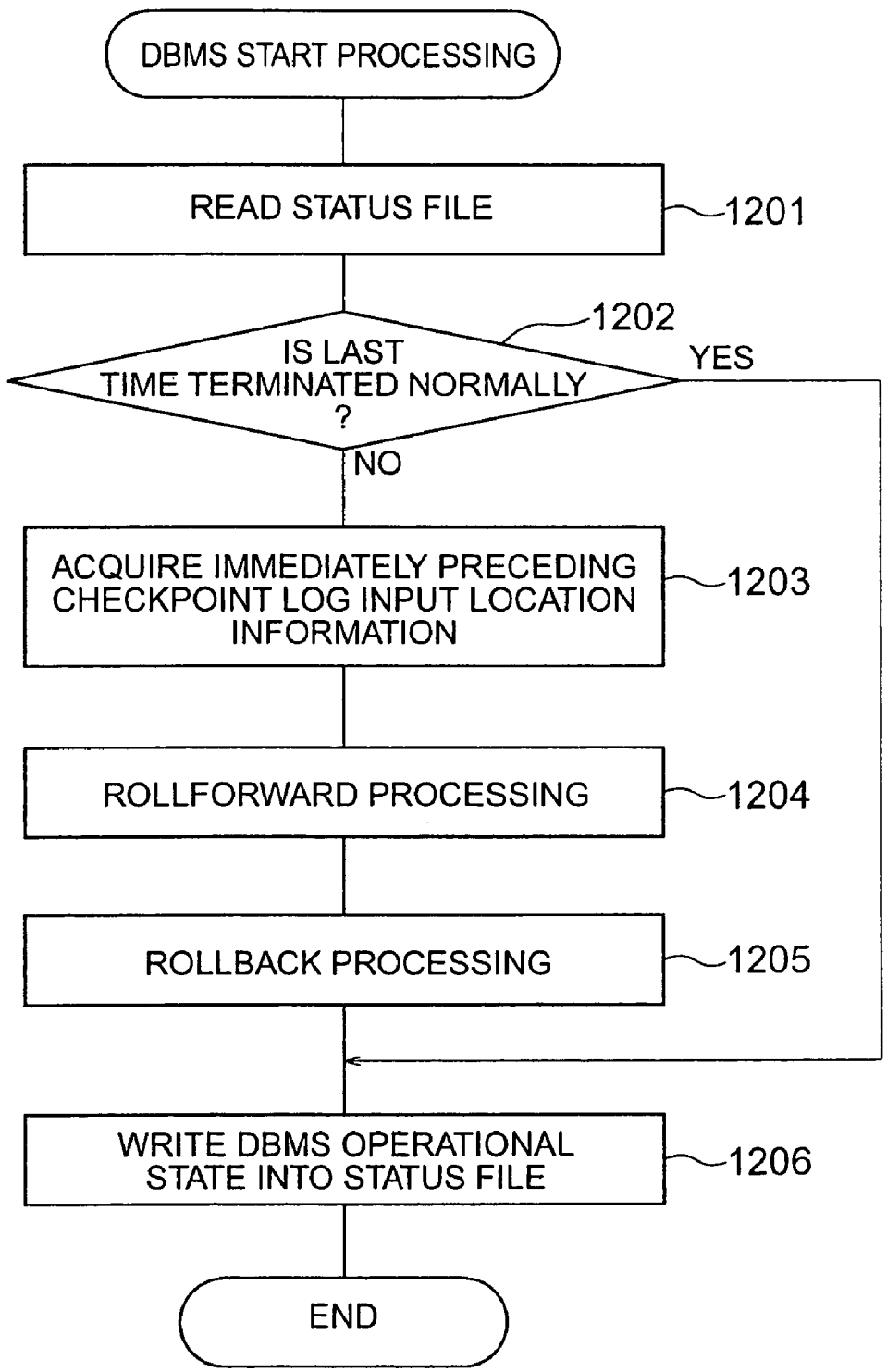
FIG. 10 is a flow chart showing a processing procedure of DBMS start processing in the present embodiment.

FIG. 10 is a flow chart showing a processing procedure of the DBMS start processing in the present embodiment. If switching from the primary system to the secondary system is conducted and database processing in the secondary database processing system is started, then the DB access control section 311 in the secondary host computer 3 orders the secondary disk subsystem 4 to execute the DBMS start processing.

At step 1201, the command processing section 411 in the secondary disk subsystem 4 reads out a status file on the secondary status disk 45, and acquires information indicating the state of the database. It is now supposed that information indicating that the DBMS is in operation is stored in the status file as information indicating the database state at the time of database processing start and information indicating that the DBMS has been normally finished is stored in the status file at the end of the database processing.

At step 1202, it is determined whether the database processing of the last time has been finished normally, by referring to the acquired information indicating the database state. If the acquired database state indicates that the DBMS is in operation, i.e., information indicating that the DBMS has been finished normally is not recorded in the status file, then the database processing of the last time is regarded as have not been finished normally and the processing proceeds to step 1203.

At the step 1203, status information indicating a location of a log record at the time of immediately preceding checkpoint is referred to, and an input location of the log record is acquired.

At step 1204, the secondary log disk 46 is referred to in order to read out the log record from the acquired input location, and rollforward processing is conducted on the database area in the secondary DB disk 44.

At step 1205, rollback processing for canceling processing of uncompleted transactions among transactions subjected to the rollforward processing using the log record is conducted.

At step 1206, information indicating that the DBMS is in operation and status information indicating the location of the log record after recovery are stored in the status file in the secondary status disk 45.

In general, in the conventional DBMS, data modified in a transaction is not written to the storage in synchronism with the committing of the pertinent transaction in order to ensure the execution performance of the transaction, a trigger called checkpoint having a predetermined number of times of transaction occurrence or a predetermined time as a trigger is provided. Upon the trigger, DB data modified during that time is written to the storage. And DB contents modified after the checkpoint are written to the log disk. In restart processing at the time of server down, DB modification after the checkpoint is restored and recovered from modification history in the log disk.

At the time of restart after the server shut down, from which location in which log disk log information should be forced after the latest checkpoint poses a problem. In general, such information is stored in a header portion or the like on the log disk. A log disk and a read location that becomes a subject of the force at the time of restart are determined on the basis of the information.

In the case where a log disk is subjected to synchronous copy and a DB disk is subjected to asynchronous copy in such a conventional DBMS, there is a possibility that modification contents of DB subjected to checkpoint on the log disk in the main site have not been transferred. Modification contents of DB forced to the storage in the main site at the time of checkpoint are lost in the remote site, and mismatching is caused in the recovery.

On the other hand, in the disaster recovery system of the present embodiment, a status file for managing a log disk input point at the time of checkpoint is provided so as to prevent mismatching from being caused in recovery in the secondary disk subsystem 4 even if a log block is subjected to synchronous remote copy processing and a DB block is subjected to asynchronous remote copy processing. In addition, the status file is transferred in asynchronous remote copy processing, and the modification order between the status file and the DB block transferred asynchronously in the same way is guaranteed by the secondary disk subsystem 4.

As a result, it is possible to refer to the status file on the secondary status disk 45 at the time of database processing start after the switching from the primary system to the secondary system, and conduct recovery from a location indicated by the status information.

In the disaster recovery system of the present embodiment, a write request at the time of checkpoint is also transmitted to the secondary disk subsystem 4 asynchronously as described above. In the case where a write request at the time of checkpoint has been issued, however, that write request and write requests temporarily stored until that time point for asynchronous writing may also be transmitted to the secondary disk subsystem 4.

Figure 11:
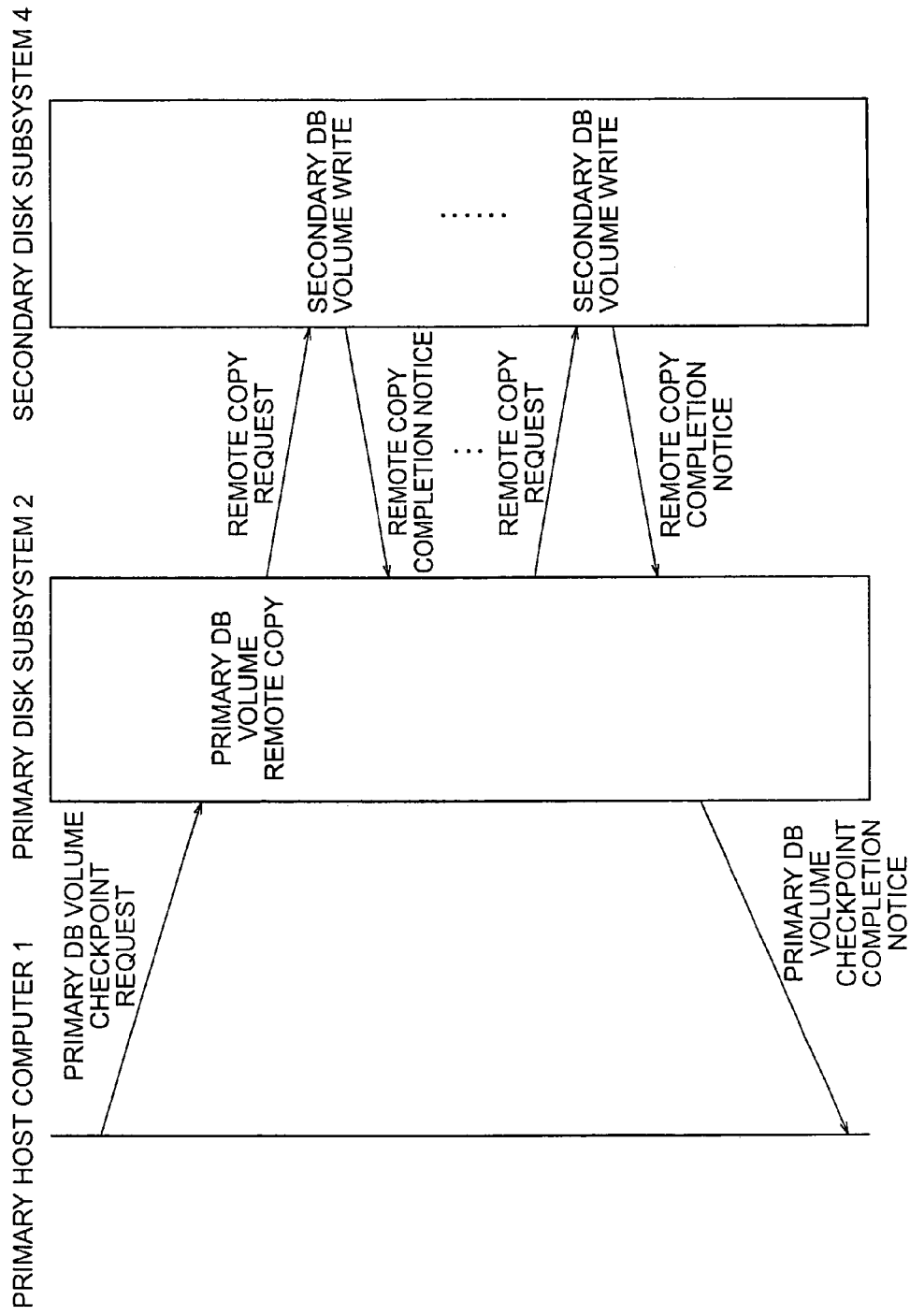
FIG. 11 is a diagram showing an outline of synchronous remote copy processing conducted at the time of checkpoint in the present embodiment.

FIG. 11 is a diagram showing an outline of processing conducted at the time of checkpoint in the present embodiment. If a primary DB volume checkpoint request for requesting a checkpoint of the primary DB disk 24 is transmitted from the primary host computer 1 as shown in FIG. 11, then the primary disk subsystem 2 transmits remote copy data temporarily stored in the queue in the memory or magnetic disk in the primary disk subsystem 2 at that time to the secondary disk subsystem 4, and transmits the DB block 242a and status information received together with the primary DB volume checkpoint request to the secondary disk subsystem 4.

The secondary disk subsystem 4 writes all of the DB block 242a and status information transmitted together with the write request into the cache 42, and then generates a remote copy completion notice, which indicates that the writing has been completed, and transmits the remote copy completion notice to the primary disk subsystem 2.

Upon receiving the remote copy completion notice from the secondary disk subsystem 4, the primary disk subsystem 2 generates a primary DB volume checkpoint completion notice indicating that the checkpoint processing requested by the primary host computer 1 has been completed, and transmits the primary DB volume checkpoint completion notice to the primary host computer 1.

In the case where synchronization processing of the primary disk subsystem 2 and the secondary disk subsystem 4 is conducted at the time of the log block write request and the checkpoint request in the disaster recovery system of the present embodiment, the contents of modification in transactions completed in the primary system are prevented from being lost in the secondary system, and writing the DB block and status information is conducted collectively at the time of checkpoint. As compared with the case where all of the DB block and status information are transferred by using synchronous remote copy, therefore, performance degradation in the primary system can be prevented. Even in a configuration using a database management system that does not have a dedicated status file, DB modification data forced to the storage in the primary system at the time of checkpoint is not lost in the secondary system.

According to the disaster recovery system of the present embodiment, log information is modified by synchronous writing and database data and status information are modified by asynchronous writing, when writing to the secondary system is requested, as heretofore described. Therefore, the contents of modification in transactions completed in the primary system are prevented from being lost in the secondary system. It is possible to construct a disaster recovery system reduced in performance degradation in the primary system.

According to the present invention, it becomes possible to reduce the possibility that modification contents of transactions completed in execution are lost in the transaction processing.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disaster recovery method for conducting switching to a secondary database processing system when a failure has occurred in a primary database processing system and continuing database processing, the disaster recovery method comprising the steps of:

receiving a write request of log information indicating contents of database processing conducted for a database buffer in a host computer, database data modified in the database buffer, and status information indicating a location of log information to be used at time of recovery from a failure, from the host computer;

modifying log information, data in a database area, and status information in a primary storage subsystem of the primary database processing system according to contents of the received write request;

conducting synchronous writing of a received write request of log information into a secondary storage subsystem of the secondary data processing system;

temporarily storing a received write request of database data or status information and conducting asynchronous writing of the received write request of database data into the secondary storage subsystem;

receiving, by the secondary storage subsystem, a write request of the log information, database data or status information from the primary storage subsystem;

modifying log information, data in a database area, or status information in the secondary storage subsystem according to contents of the received write request; and at time of start of database restart processing after recovery from the failure in the primary database processing system, in the secondary database processing system, reading out log information generated after the failure, from a location indicated by status information modified in the secondary storage subsystem, modifying data in the database area in the secondary storage subsystem according to contents of the log information, and thereby restoring the database area in the secondary storage subsystem to a state in the database area in the primary storage subsystem.

2. A disaster recovery method for conducting switching to a secondary database processing system when a failure has occurred in a primary database processing system and continuing database processing, the disaster recovery method comprising the steps of:

receiving a write request of log information indicating contents of database processing conducted for a database buffer in a host computer, database data modified in the database buffer, and status information indicating a location of log information to be used at time of recovery from a failure, from the host computer;

modifying log information, data in a database area, and status information in a primary storage subsystem of the primary database processing system according to contents of the received write request;

conducting synchronous writing of a received write request of log information into a secondary storage subsystem of the secondary database processing system;

temporarily storing a received write request of database data at a time other than checkpoint and conducting asynchronous writing of the received write request of database data into the secondary storage subsystem;

upon receiving a write request of database data and status information at a time of checkpoint, storing the write request together with the temporarily stored write request into the secondary storage subsystem and thereafter sending a completion notice to the host computer;

receiving, by the secondary storage subsystem, a write request of the log information, database data or status information from the primary storage subsystem;

modifying log information, data in a database area, and status information in a secondary storage subsystem according to contents of the received write request; and at time of start of database restart processing after recovery from the failure in the primary database processing system, in the secondary database processing system, reading out log information generated after the failure, from a location indicated by the status information, modifying data in the database area in the secondary storage subsystem according to contents of the log information, and thereby reproducing the database area in the secondary storage subsystem to a state in the database area in the primary storage subsystem.

* * * * *